US012560901B1

(12) United States Patent
Naserimojarad et al.

(10) Patent No.: US 12,560,901 B1
(45) Date of Patent: Feb. 24, 2026

(54) COLLABORATIVE AGENTS FOR MANAGING ENERGY CONSUMING DEVICES AND METHODS THEREON

(71) Applicant: LOD Technologies Inc., Burnaby (CA)

(72) Inventors: Medi Naserimojarad, Vancouver (CA); Mostafa Shariat, Vancouver (CA)

(73) Assignee: LOD Technologies Inc., Burnaby (CA)

( * ) Notice: Subject to any disclaimer, the term of this patent is extended or adjusted under 35 U.S.C. 154(b) by 0 days.

(21) Appl. No.: 18/989,975

(22) Filed: Dec. 20, 2024

Related U.S. Application Data

(60) Provisional application No. 63/700,721, filed on Sep. 29, 2024.

(51) Int. Cl.
*G05B 19/042* (2006.01)
(52) U.S. Cl.
CPC .... *G05B 19/042* (2013.01); *G05B 2219/2642* (2013.01)
(58) Field of Classification Search
CPC ...................... G05B 19/042; G05B 2219/2642
See application file for complete search history.

(56) References Cited

U.S. PATENT DOCUMENTS

| | | | |
|---|---|---|---|
| 2016/0041851 A1* | 2/2016 | Bauerle | G06F 9/5027 709/224 |
| 2018/0219941 A1* | 8/2018 | An | G06F 9/5088 |
| 2019/0212802 A1* | 7/2019 | Srinivasan | G06Q 50/06 |
| 2024/0231463 A1* | 7/2024 | Karuppiah | G06F 11/00 |
| 2024/0392988 A1* | 11/2024 | Sarkar | F24F 11/46 |
| 2025/0016115 A1* | 1/2025 | Ghosh | H04L 47/125 |

* cited by examiner

*Primary Examiner* — Michael W Choi
(74) *Attorney, Agent, or Firm* — Own Innovation; James W. Hinton; Daniel Biggs

(57) ABSTRACT

A system for monitoring and managing internet of things devices, the system comprising a distributed approach, wherein a cloud server coordinates control agents that directly manage IoT devices. The agents collaborate to handle device monitoring, data collection, and command execution in a closed-loop manner, ensuring continuous oversight. The Agents can autonomously reissue commands if execution fails, stop devices if necessary, and even share control responsibilities among themselves, providing redundancy. This decentralized approach reduces reliance on a central server, minimizes single points of failure, and improves responsiveness by allowing agents to manage devices independently or in cooperation.

20 Claims, 4 Drawing Sheets

COLLABORATIVE AGENTS FOR MANAGING ENERGY CONSUMING DEVICES AND METHODS THEREON

TECHNICAL FIELD

The present disclosure generally relates to managing Internet of Things ("IoT") devices, and more particularly relates to managing IoT devices using collaborative control agents.

BACKGROUND OF THE INVENTION

In modern datacenters, managing a large number of devices, such as application-specific control circuits (ASICs) and power distribution units (PDUs), presents challenges in terms of scalability, reliability, and efficiency. Traditional systems rely heavily on centralized control, which can create bottlenecks, latency issues, and single points of failure. As IoT deployments in datacenters grow, the limitations of current centralized management systems become apparent. Central servers can become overwhelmed, resulting in delayed responses or failed command execution. Moreover, there is a lack of adaptability in handling offline agents or the introduction of new agents. Systems are generally ill-equipped to optimize energy consumption or manage devices efficiently across multiple infrastructure layers, which further complicates operations and increases costs. These issues highlight the need for a more distributed, resilient, and intelligent approach to managing IoT devices, as existing solutions often fail to provide sufficient redundancy, dynamic load balancing, and efficient communication between devices, leading to unoptimized resource use and potential system downtime.

Accordingly, due to the increasing complexity of Internet of Things (IoT) systems and greater energy efficiency needs, there is a need for better systems for monitoring, control, and communication in respect of IoT devices.

SUMMARY

Provided herein are systems and methods for managing IoT devices. A system for monitoring and managing a plurality of devices including one or more energy-consuming devices in a facility is provided. The system includes a network including the plurality of devices, a plurality of control agents connected to the plurality of devices, and a cloud server connected to the plurality of control agents. Each control agent from the plurality of control agents is dynamically assigned to a batch of devices from the plurality of devices according to an assignment criterion to share management of the plurality of devices among the plurality of control agents, and each control agent monitors (reading and tracking) status, data, and metrics of each device in the assigned batch of devices and/or sends a command to the device in a closed loop manner. Execution of the command is monitored by the control agent and the command is re-sent in case the command is not executed by the device or in case there is no status change in the device after successful execution of the command.

The cloud server may include one or more servers for improved backup, reliability, and redundancy. The control agent may monitor the execution of the command continuously with a set frequency. If the command is not executed as expected or if the device has unexpectedly changed its status after successful execution of the commands and after an elapsed time, such that it renders the command as not executed, the control agent may resend the command or may take corrective action.

The assignment criteria may be based on one or more of: a random assignment protocol, a location of each device in the plurality of devices an address range of the device, and an electrical phase powering the device. The assignment criteria may be defined by the cloud server or a select control agent from the plurality of control agents. The select control agent may be a superior agent or an agent with a certain criterion.

Each control agent from the plurality of agents may assume a role where a control agent with an assumed role is a master in the role among the plurality of control agents. The role may be selected from one or more of: a master network agent, and a master device command agent.

The plurality of devices may be assigned to the control agents according to an IP address, a physical address of the control agents, and/or based on capacity of the control agents.

A first and a second control agent may be assigned to the same batch of devices in the network. The first and the second control agents may monitor and send commands to the devices of the assigned batch of devices simultaneously.

If a new control agent is added to or goes offline from the network, or if new devices are added to or removed from the network, assignment of available devices from the plurality of devices may be redistributed among available control agents from the plurality of control agents. If a workload on one or more control agents from the plurality of control agents is imbalanced, the plurality of control agents may rebalance the assigned batch of devices to improve load balancing among the plurality of control agents.

The redistribution of the assignment of the available devices to the available control agents may be carried out by a rebalancing command initiating from the cloud server or from a control agent from the plurality of control agents. The rebalancing command may be broadcasted by a control agent to all other control agents in the plurality of control agents.

When a new control agent is added to the network, the new control agent may identify its assigned local IP and MAC address to the cloud server or other control agents in the network to facilitate rebalancing of the plurality of devices to the plurality of control agents.

A first control agent may detect a second control agent going offline and the plurality of control agents may be reassigned to the plurality of devices to fill-in for the second control agent.

The system may further include a log file including a list of the plurality of control agents, their status, and their assigned batch of devices. The log file may be accessible to and modifiable by each control agent from the plurality of control agents.

A control agent from the plurality of control agents may be requested (either manually or automatically according to a rule) to scan for new or missing devices connected to the network.

A device from the plurality of devices may be a frequency meter configured to measure frequency of electrical energy supplied to the facility, and data monitored from the frequency meter may trigger a command generated at a control agent to modify the operation of one or more of the devices from the plurality of devices.

A system for monitoring and managing a plurality of devices including one or more energy-consuming devices in a facility is provided. The system includes a network including the plurality of devices, a plurality of control agents connected to the plurality of devices, each control agent from the plurality of control agents being assigned to a batch of devices from the plurality of devices according to one or more assignment criteria to share management of the plurality of device among the plurality of control agents, and a cloud server connected to the plurality of control agents. Each control agent monitors each device by reading and tracking status, data, and metrics of the device in the assigned batch of devices and sending a command to the device in a closed-loop manner. Execution of the command is monitored by the control agent. The command is re-sent where the command is not executed by the device or where there is an unexpected change in the status of the device after successful execution of the command.

The cloud server may include one or more servers.

The control agents may monitor the execution of the command continuously with a set frequency.

Where the command is not executed by the device or where there is an unexpected change in the status of the device after successful execution of the command, and after an elapsed time, the control agent may take corrective action.

The assignment criteria may include one or more of: a randomly assigned protocol, a physical address of each control agent, a capacity of the control agent, a location of each device in the plurality of devices, an address range of the device, and an electrical phase powering the device.

The one or more assignment criteria may be defined by the cloud server or a selected control agent from the plurality of control agents.

The selected control agent may be a superior agent or an agent with a certain criterion.

Each control agent from the plurality of agents may be configured to assume a role in response to the command, and a control agent with an assumed role may be a master in the role among the plurality of control agents.

The role may include a master network agent and a master device command agent.

Multiple control agents, from the plurality of control agents, may be assigned to the same batch of devices.

Each of the multiple control agents may be configured to monitor and send commands to the devices of the assigned batch of devices simultaneously.

Where a new control agent is added to or goes offline from the network, assignment of the plurality of devices may be redistributed among available control agents from the plurality of control agents.

Where workloads on one or more control agents from the plurality of control agents are imbalanced, the plurality of control agents may be configured to redistribute the assigned batch of devices to improve load balancing among the one or more control agents on which the workloads are imbalanced.

The redistribution of assignment of the available devices to the available control agents may be effected by a rebalancing command initiated from the cloud server or from a control agent from the plurality of control agents.

The rebalancing command may be broadcasted by a control agent to all other control agents in the plurality of control agents.

When a new control agent is added to the network, the new control agent may identify an assigned local IP and MAC address to the cloud server or other control agents in the network to facilitate rebalancing of the plurality of devices to the plurality of control agents.

A first control agent may be configured to detect a second control agent going offline, and the plurality of control agents may be configured to be reassigned to the plurality of devices to fill in for the second control agent.

The system may further include a log file stored at the cloud server and/or on a control agent, the log file including a list of the plurality of control agents, a status of each of the plurality of control agents, and the batch of devices assigned to each of the plurality of control agents.

The log file may be accessible to and modifiable by each control agent from the plurality of control agents.

A control agent from the plurality of control agents may be configured to be requested, manually or automatically according to a rule, to scan for new or missing devices connected to the network.

A device, from the plurality of devices, may be a frequency meter configured to measure frequency of electrical energy supplied to the facility, and data monitored from the frequency meter may be configured to trigger a command generated at a control agent, from the plurality of control agents, to modify the operation of one or more of the devices.

A method for monitoring and managing a plurality of devices including one or more energy-consuming devices in a facility is provided. The method includes assigning a plurality of control agents, from a plurality of control agents, to a batch of devices, from a plurality of devices, according to one or more assignment criteria to share management of the plurality of devices among the plurality of control agents, and connecting a cloud server to the plurality of control agents. Each control agent monitors each device by reading and tracking status, data, and metrics of the device in the assigned batch of devices and sending a command to the device in a closed-loop manner. Execution of the command is monitored by the control agent. The command is re-sent where the command is not executed by the device or where there is no change in the status of the device after successful execution of the command.

Other aspects and features will become apparent to those ordinarily skilled in the art upon review of the following description of specific disclosed embodiments in conjunction with the accompanying figures.

BRIEF DESCRIPTION OF THE DRAWINGS

In the following, embodiments of the present disclosure will be described with reference to the appended drawings. However, various embodiments of the present disclosure are not limited to the arrangements shown in the drawings.

DETAILED DESCRIPTION

Figure 1:
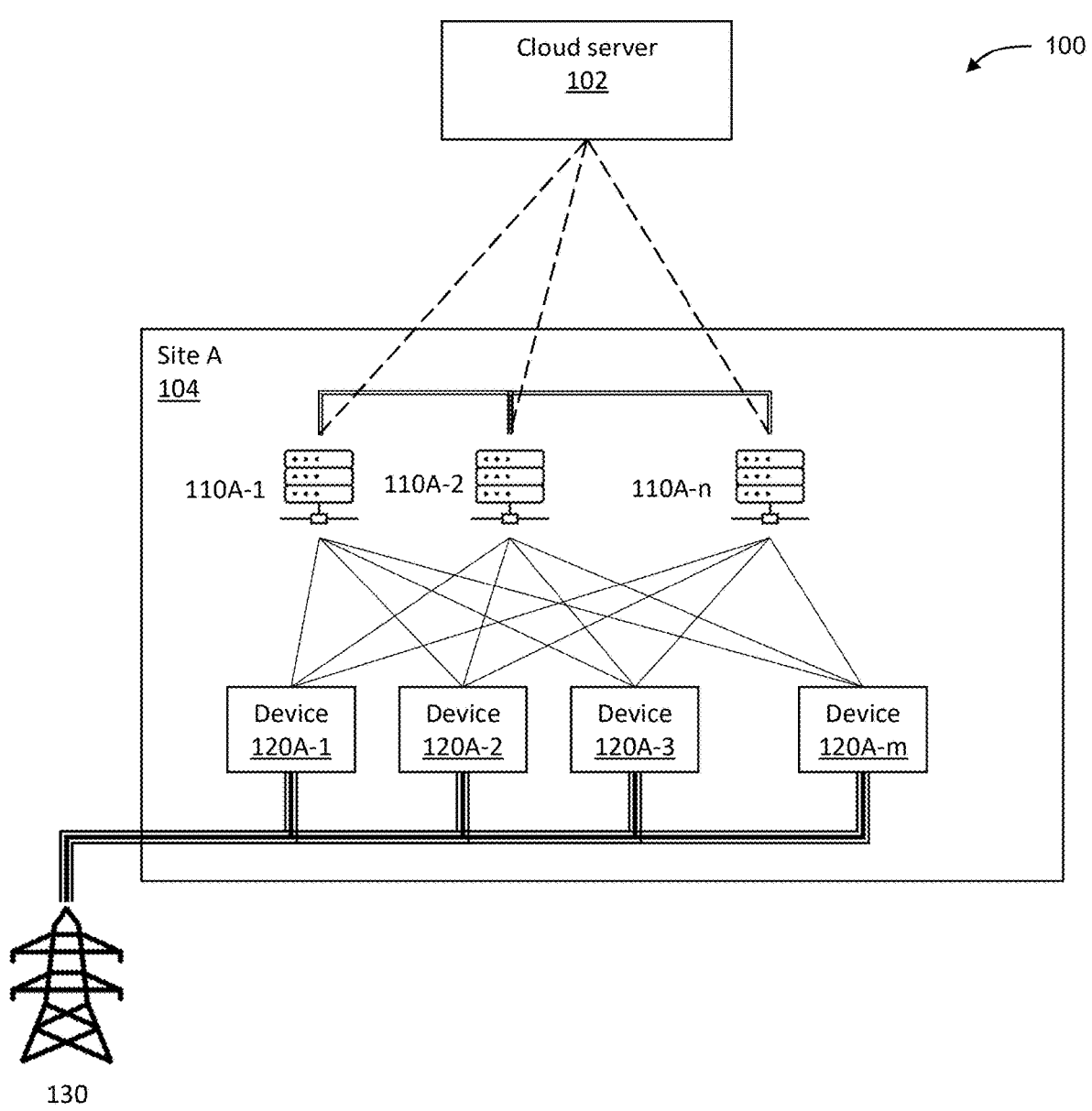
FIG. 1 is a schematic diagram showing the disclosed device management system, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Throughout this disclosure, compliance obligations may refer to both contractual agreements, such as energy agreements defined and exemplified later in the description, and government or industry regulations, such as data privacy and environment, social, governance (ESG) regulations.

Network refers to the interconnected system of IoT devices, control agents, and one or more cloud servers. The network refers both to the interconnected system of local devices within a facility, as well as its connection with off-site and remote servers and devices. The Network includes the communication infrastructure that enables data exchange, monitoring, and command execution between these components. The network encompasses both the physical connections (such as wired or wireless links) and the protocols (like TCP/IP, Bluetooth™, or Zigbee™) used to facilitate communication and coordination between devices, agents, and the cloud.

Load shaping refers to deliberate management and adjustment of a facility's power consumption profile over time. For example, datacenters may use load shaping to reduce peak power demands, take advantage of low energy prices or avoid times of high prices, enhance energy efficiency, and potentially participate in demand response programs and ancillary services related to a power grid.

Sending or commissioning instructions or commands to a device may refer to sending instructions to the device itself or a controller overseeing one or more devices including the device. The instructions or commands may include high-level strategies (e.g., follow a power consumption target directive, prioritize environmental impacts over cost savings), may include detailed tasks (e.g., shut down a single device, shutdown all or a certain percentage of connected devices, adjusting power consumption of one or more connected device), or may be a combination thereof.

In this disclosure, among other solutions, a distributed approach for IoT device monitoring and control is introduced, where a cloud server coordinates control agents that directly manage IoT devices. These agents handle device monitoring, data collection, and command execution in a closed-loop manner, ensuring continuous oversight. The control agents autonomously reissue commands if execution fails, stop devices if necessary, and even share control responsibilities among themselves, providing redundancy. This decentralized approach reduces reliance on a central server, minimizes single points of failure, and improves responsiveness by allowing agents to manage devices independently or in cooperation.

Referring now to FIG. 1, a schematic diagram of an Internet of things (IoT) device management system is generally shown at 100, according to an embodiment. The system 100 includes a cloud server 102 connected to a network of local control agents 110A-1 to 110A-n (collectively referred to as the agents 110 and generically as the agent 110) at a facility 104, such as site A. The agents are connected (wiredly or wirelessly) to one or more IoT devices 120A-1 to 120A-m (collectively referred to as the devices 120 or IoT devices 120 and generically as the device 120 or IoT device 120, to manage the operation of IoT devices (e.g. read data, send commands, send queries, track device status, etc.).

In an embodiment, Site A is a datacenter facility (e.g. data storage and processing centers and cryptocurrency mining sites) and the IoT devices are ASICs and PDUs in the datacenter facility.

In other embodiments, Site A is a facility selected from the group consisting of power generation facilities, Energy storage facilities, smart building facility, and a facility with a swarm of robots (e.g., a material mining site with autonomous ground and aerial vehicles).

The IoT devices 120 may include electrical motors, actuators, sensors, power storage units, robots, vehicles, and computers which are connected to the network. The devices 120 consume electrical energy, and their energy may be sourced from various sources such as power grid 130, an on-site or off-site power generation unit (not shown), or on-site or off-site energy storage units (such as back-up batteries) (not shown). The device management system 100 may further include other sites and facilities (e.g. Site B, Site C, etc.) (not shown). For example, the cloud server 102 may be in communication with control agents in other local or remote facilities, providing a broader network of connected devices. In an embodiment, a control agent in one facility (e.g., agent 110A-1 from Site A 104) is assigned to devices in other facilities (e.g. Site B) to monitor and control them.

The communication between the cloud server 102, the agents 110, and the devices 120 is facilitated by one or more wired or wireless communication protocols, including but not limited to TCP/IP, Bluetooth, WiFi, Lora™, Zigbee, and other wired or wireless options. This ensures robust communication channels suited to different operational requirements in various applications and for various types of facilities.

The cloud server 102 is configured to act as the supervisory entity of the entire system 100. The cloud server 102 oversees the overall network, manages agent allocation, sets up rules for device management, and may initiate rebalancing commands. The cloud server 102 is configured to assign or reassign the IoT devices 120 to one or more control agents 110 based on one or more criteria such as device location, IP address ranges, or electrical infrastructure phases of the devices 120. In cases where device rebalancing is desired, the cloud server 102 is further configured to broadcast rebalancing commands to the agents 110. The cloud server 102 may include one or more servers including a backup server to support workload and redundancy in case of failure of the main server.

Although the cloud server 102 coordinates high-level activities, the control agents 110A-1 to 110A-n are configured to operate independently and to autonomously control many responsibilities, ensuring the system 100 continues functioning if the cloud server 102 is unavailable or if network latency becomes problematic.

Each IoT device 120 includes a unique ID to be identifiable in the network. The ID assigned to each device 120 may be the assigned internet protocol (IP) address assigned to each device 120 when deployed to the network, may be the unique MAC or physical address of each device 120, or may be any other unique identifier associated with each device 120 in the network. In an embodiment, the ID of the devices 120 is collected by an agent 110 from the plurality of agents 110 and is broadcasted across the network, including to the other agents 110 and to the cloud server 102. The IP address of each device 120 may be assigned in various ways such as DHCP (i.e., each device 120 receives an arbitrary IP address related to a network they are connected to), static IP address proposed by the device 120 (i.e. the device 120 requests a certain IP address from a network administrator and is assigned with the default proposed IP address if the address is available), and static IP proposed by a router/switch (which may be a control agent 110) where the device 120 is connected to a connection port (e.g., ethernet port) of the router and the device 120 is assigned the IP address which is assigned to the connection port.

Figure 2A:
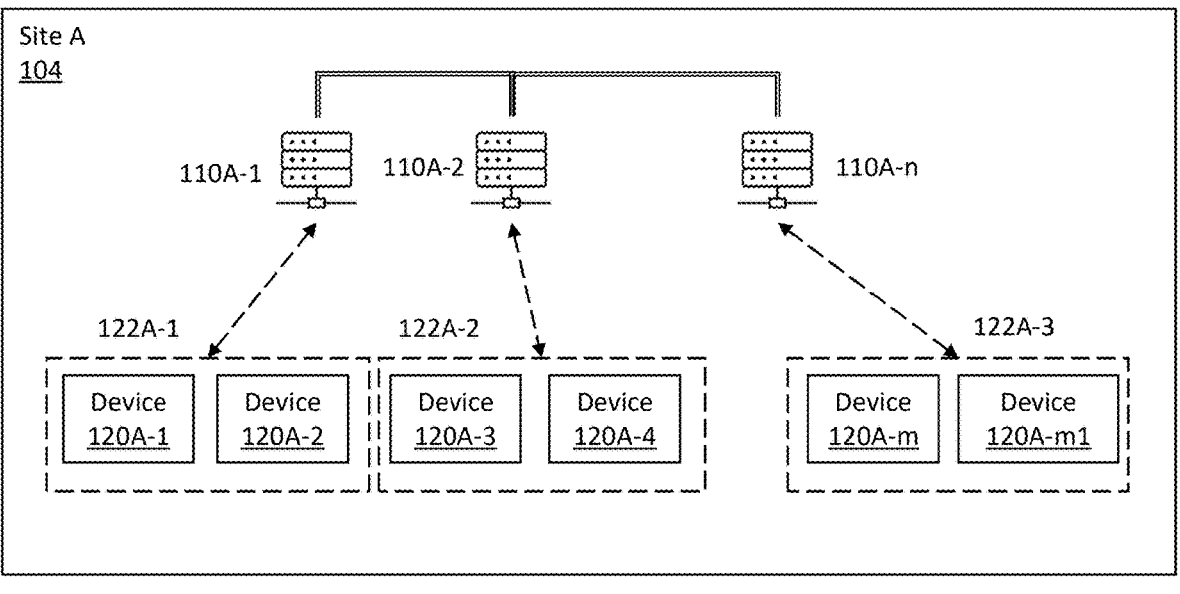
FIG. 2A to 2C are a series of schematic diagrams showing various configurations of assigned devices to control agents of the device management system of FIG. 1, according to respective embodiments.

The control agents 110 are configured to facilitate managing the devices 120. Each agent 110 is assigned to manage a batch of devices 120 (e.g. device batch 122A-1 assigned to agent 110A-1 as shown in FIG. 2A) to enable distribution of device management tasks among multiple agents 110 rather than just one cloud server 102. Each agent (e.g., agent 110A-1) is not only responsible for continuously monitoring the batch of devices (e.g. device batch 122A-1) but is further responsible for sending or commissioning commands (e.g. turn off, restart, overclock, underclock, change status, etc.) to the assigned device batch (e.g., device batch 122A-1). For effective execution of commands sent to the devices 120, each agent 110 commissions commands to the devices 120 in a closed-loop fashion. In the closed-loop fashion, the agent 110 monitors and tracks the execution status of the commands by the devices 120 and, if the devices 120 fail to execute commands correctly, the agent 110 autonomously resends the commands or takes corrective action. Commissioning the commands and tracking the execution status of the commands on the devices 120 may be implemented by the agents 110 continuously or periodically with a set frequency (e.g. every 5 minutes, at 1 pm every day). The control agents 110 may be configured to query the IoT devices 120, read/write data to and from the devices 120 (e.g. response by the device 120 to a query by the agent 110, device data published by the device 120, modifying configuration of the devices 120 such as modifying state of the devices 120), applying logic rules, and outputting calculation and rule evaluation results. The agents 110 may be configured to pull data from the device 120 status of the device 120, performance metrics of the device 120, and health data of the device 120.

Figure 3:
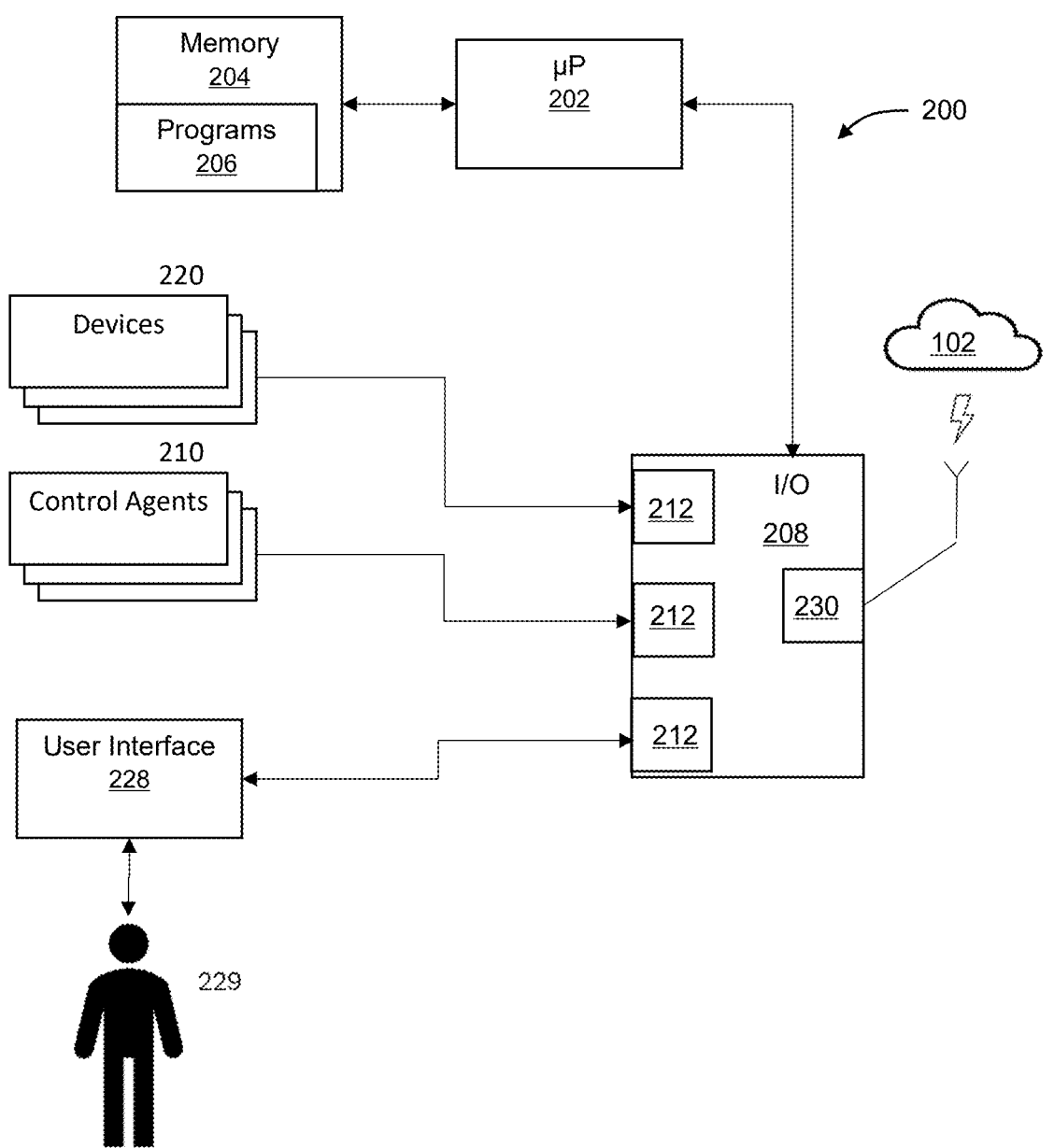
FIG. 3 is a schematic diagram of a processor circuit for implementing a control agent of the device management system of FIG. 1, according to an embodiment.

Referring now to FIG. 3, shown therein is a schematic diagram of a processor circuit 200 for implementing a control agent 110 (e.g. 110A-1), according to an embodiment. The processor circuit 200 is accordingly variously referred to as a control agent 200 herein. The control agent 200 may be implemented using an embedded processor circuit such as a Linux-operated computer. The control agent 200 includes a microprocessor 202, a memory 204, and an input output (I/O) module 208, all of which are in communication with the microprocessor 202. The I/O 208 includes one or more wireless interfaces 230 (such as an IEEE 802.11 interface) for wirelessly receiving and transmitting data communication signals between the control agent 200 and other agents or the cloud server 102 through a wireless network. The I/O 208 further includes a plurality of wired network interfaces 212 (such as an Ethernet, USB, CAN interface) for connecting to IoT devices 220 and a plurality of control agents 210. The I/O 208 may further be in communications with a user interface 228 for facilitating interactions between the control agent 200 and a user 229.

The user interface 228 is configured to receive information, such as logged data, from the control agent 200, to program the control agent 200, for example by storing programs 206 on the memory 204, or for diagnosing or configuring the control agent 200. The user 229, in controlling or providing input to the user interface 228, may accordingly program the control agent 200. Alternatively, the user 229 may interact with the control agent 200 through a user interface of the cloud server 102 or a user interface of another control agent.

The programs 206 are embodied or stored in one or more non-transitory computer-readable storage media. The programs 206 include various instructions, such as rule-based algorithms or machine-learning-based algorithms, to instruct the control agent 200 to manage the devices 220 (e.g. monitoring the devices 220 and sending commands to the devices 220 in a closed-loop manner) and how to function within the network with the plurality of control agents 210 and the cloud server 102.

The programs 206 may include instructions for the control agent 200 to monitor one or more of the devices 220 (e.g., read data and track metrics of the devices 220) with a set sampling rate. The programs 206 may further include functions which when triggered are configured to cause the control agent 210 to send a command to one or more of the devices 220. For example, the programs 206 may include instructions for reading and tracking power consumption of the devices 220 and, when the power consumption of a device within the devices 220 increases above a maximum threshold, triggering the control agent 210 to commission a command to the device 220 to cause the device 220 to reduce the power consumption below the threshold (e.g., shutting down the device 220, underclocking the device 220, or by reducing workload to the device 220, among other examples). The agents 210 may be instructed to keep track of all or a portion of historical data read and recorded from the devices 220. To prevent loss of data but further to prevent collecting unnecessary data, the agents 210 may be programmed to store some or all of the collected data from the devices 220 and commands and events communicated by or to the agents 210. The stored data may be shared with other agents 210 or shared with the cloud server 102 for safe keeping. Some or all of such data may be compressed or processed according to a given protocol to reduce the data storage size. In some examples, the cloud server 102 may request the agents 210 to send a specific batch of data related to a specific time frame and/or related to a specific batch of devices 220 and/or specific set of metrics or device data.

In an embodiment, a user 229 programs a first control agent 210 by a set of rules which, when triggered, are configured to initiate commissioning commands to the devices 220. Such programs 206 may be shared with other control agents 210 by directly being communicated with the other control agents 210 or by being broadcasted by the first control agent 210 to the network of other control agents 210.

In an embodiment, the control agents 210 are virtual control agents 210 implemented by a virtual machine (VM) or a loadable software container (e.g., using Docker™) that reside on a physical controller or computer (e.g., stored on a computer and loadable by a microprocessor, such as the microprocessor 202). For example, a single physical controller (or physical computer) may run two or more virtual control agents 210, with each virtual control agent 210 being assigned a separate batch of devices 220 and being config-
ured to monitor and manage the assigned batch of devices
220.

An agent (e.g., the agent 110A-1) may be assigned to a
batch of devices based on a variety of criteria, such as
random assignment, physical location of devices (e.g.,
agents 110 being assigned to a group of devices 120 physi-
cally closest to the agent 110); IP or MAC address or range
of devices 120 or agents 110, and electrical infrastructure
phase (e.g., an agent 110 being assigned to only devices 120
that are powered by phase 1 of an electrical power source,
as phase management and balancing phases may impact
energy consumption of the devices 120).

In an embodiment, the cloud server 102, a superior agent
(which may be referred to as an agent 110s hereafter), or an
arbitrary agent 110 may define rules and criteria for assign-
ing devices 120 to agents 110. The superior agent 110s is a
control agent 110 distinguished by a special characteriza-
tion, such as possessing unique identifiers (e.g., the smallest
or largest ID, IP, or MAC address), being the oldest agent in
the network (i.e., the first to join the network), or having
superior computational resources (e.g., enhanced CPU or
memory capacity). The devices 120 may be assigned to
agents 110 according to IP and/or physical address of agents
110, based on the capacity and capability of each agent 110
such as memory capacity, CPU capacity, communication
capacity, and number of ports on the agent 110. The assign-
ment may be initiated by the cloud server 102, the superior
agent 110s, or by the arbitrary agent 110 based on defined
rules. In one embodiment, the criteria to assign devices 120
to agents 110 are dynamic and may be changed according to
a rule (e.g., during peak grid power consumption, assign
devices 120 with similar electrical phase to one assigned
agent 110) that could be defined manually or automatically
by the cloud server 102 or an agent 110. In some embodi-
ments, one superior agent 110s broadcasts device assign-
ment rules and criteria to one or more other agents 110 or
alternatively broadcasts the ID of devices 120 assigned to
each agent 110 such that all agents 110 are informed about
their own assigned batch of devices 120 as well as the batch
of devices 120 assigned to other agents 110 in the network.

According to one embodiment, the agents 210 are
requested to scan for devices 220 available in the network.
The request may be administered manually such that a user
(e.g., the user 229 or a user of the cloud server 102) sends
commands to one or more agents 210 to find new or missing
devices 220 in the network. Once new devices 220 are found
on the network, an agent 210 is assigned to the devices 220
and rules or commands will be set related to the newly found
devices 220. The request may be programed into the agents
210 where one or more agents 210 periodically scan for new
devices 220 in a set IP range, and once new devices 220 are
found, agents 210 are assigned to the found devices 220 and
rule or commands are set on the newly found devices 220.
The request may be triggered based on an event (e.g. if a
device 220 is missing from a list of devices 220). The
scanning to find the missing device 220 may happen peri-
odically, may happen once, or may happen continuously
with a set frequency until the missing device 220 is found.

In an embodiment, one or more roles are defined for
assumption by the agents 210. For example, an agent 210
may be a master in network commands (i.e., administering
and commissioning network scanning, finding new devices
220 in the network, updating a list of devices 220 in the
network), while another agent 210 may be a master in
distributing device commands (i.e., administering and commissioning commands to devices 220 such as power cut
commands, device shutdown commands, etc.).

The agents 210 may also communicate with one another
to share or broadcast assigned devices 220, status of devices
220, handle command delegation, and provide redundancy.
This peer-to-peer communication enables the agents 210 to
coordinate device management in case a change occurs in
the network, such as if an agent 210 fails, an agent 210 is
added, a new batch of devices 220 enters the network, or an
existing batch of devices 220 are removed from the network.
In an embodiment, each agent 210 includes a log file that
may be shared with other agents 210 or the cloud server 102.
The log file may be stored on a memory of the agent 210 or
otherwise accessible to a processor of the agent 210. If
stored on the memory of the agent 210, the log file may be
shared with the system 100 by being broadcasted to the
network or being directly sent to each agent 210 or to the
cloud server 102. Thus, the log file may be stored or
otherwise located on a memory of the cloud server 102, each
agent 110, a batch of agents 110, or one agent 110. The log
file may include a physical or network address or ID of each
and all agents 210, the health status of each and all agents
210, and a list of all devices 220 in the network, a list of
assigned devices 220 to each and all agents 210 and their
status and specs (e.g. operational status, online or offline
status, nominal power consumption). The log file may be a
single live (synchronized) document that is shared and used
by all agents 210 and/or the cloud server 102. All the agents
210 may have read and write access to the log file and may
be configured to update the file as needed. In some
examples, two or more versions of the log file, which are not
identical, may be stored or broadcasted among the network
in an instance. In this case, some time may be needed for all
devices 220 to synchronize their log file to a single true
version. The cloud server 102 or one of the agents 210 may
be responsible to ensure synchronization between different
versions of the log file.

Figure 2B:
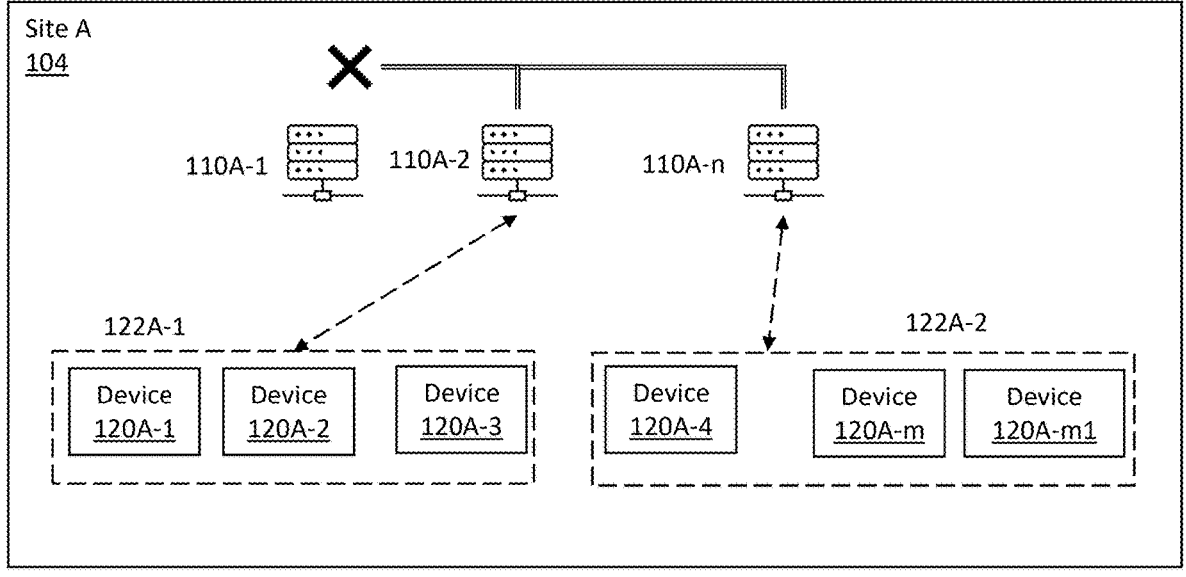

The agents 210 are configured to share responsibility for
device management by dynamically reassigning (or rebal-
ancing) assigned devices 220 when there is a change in the
network's configuration (e.g., addition or removal of devices
220 or control agents 210) or operating conditions affecting
the balance, availability, or efficiency of device 220 man-
agement by the control agents 210 (e.g., workload on an
agent 210 increases to reach the effective capacity of the
agent 210). For example, referring to FIG. 2B, if an agent
(e.g., the agent 110A-1 as shown in FIG. 2B) fails, is not
responsive to other agents 110, or goes offline, the devices
120 assigned to the failed agent (i.e., the device batch
122A-1) are reassigned or distributed to one or more other
agents (e.g., agent 110A-2). All devices 120 in the network
may be considered for a new reassignment of devices 120 to
agents 110. In the embodiment shown in FIG. 2B, the
devices 120A-1 to 120A-3 are regrouped in the device batch
122A-1 and assigned to the agent 110A-2 while devices
120A-4 to 120A-m1 are regrouped in device batch 122A-2
and assigned to agent 110A-n. As mentioned hereinabove,
the assignment may be based on factors such as IP address,
physical proximity, and the overall load or capacity of the
agents 110. This cooperative structure ensures that device
control remains efficient and distributed across the system
100. The determination that the agent 110A-1 has failed and
is offline may be made by the cloud server 102 or another
agent, such as the agent 110A-2.

Additionally, when a new agent 110 is added to the
network, the devices 120 may be rebalanced accordingly to
distribute device management responsibility among the new network of agents 110. The log file may be updated accordingly to reflect removal or addition of agents 110 to the network and the new reassignment of the devices 120 to existing agents 110.

In an embodiment, the agents 110 are capable of independent operations, enabling the agents 110 to stop or control the devices 120 without relying on the cloud server 102. In other words, the agents 110 do not depend solely on the cloud server 102 and are configured to manage the devices 120 independently, ensuring resilience of the system 100 to network outages or failures of the central cloud server 102. Additionally, the agents 110 may be configured to share or broadcast state data (read/write/stop) with one another, facilitating decentralized decision-making among the agents 110. In one example, a command is automatically generated or manually generated by the user 229 on one of the agents 110 to command all agents to send a further command (e.g. start, pause, shutdown, underclock, overclock commands) to all or a specified portion of their assigned devices 120. The command may be shared directly or broadcasted to other agents 110 by using the log file updated by the agent 110. All other agents 110 follow the commissioned command to execute them on all or the specified portion of their assigned devices 120.

Figure 2C:
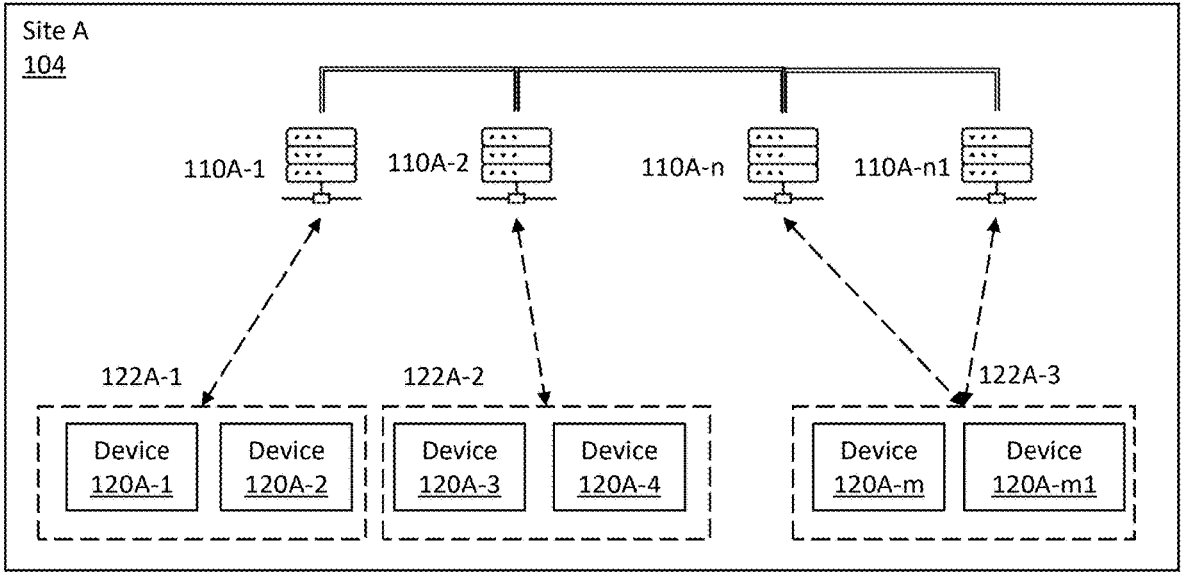

Referring to FIG. 2C, a batch 122A-3 of devices 120A-m and 120A-m1 is assigned to multiple agents 110 at the same time to provide redundancy and fault tolerance for device management. For instance, two agents 110A-n and 110A-n1 assigned to the same batch of devices 120 monitor and issue commands concurrently, providing operational redundancy in case one agent 110 fails. This redundancy adds an extra layer of reliability in managing the devices 120 by ensuring continuous operation and management of the devices 120 without disruption.

Once an agent 110 is added to the system 100 (or network), the existing agents 110 may communicate the new architecture of the network (e.g., IP, MAC addresses of existing agents 110 and list of devices 120 assigned to each agent 110) to the new agent 110. The system 100 (through instructions from the cloud server 102 or from an agent 110) is configured to automatically rebalance device assignments across all available agents 110. Similarly, if an agent 110 goes offline, the remaining agents 110 detect the failure and redistribute the affected devices accordingly.

In general, rebalancing of the devices 120 occurs when a new agent 110 is introduced to the system 100, an agent 110 goes offline, devices 120 are added to or removed from the system 100, or workload with respect to the devices 120 becomes imbalanced among the agents 110. Examples of imbalanced device workload includes imbalanced communication or response speed between devices 120 and an agent 110, imbalanced overall scan time of devices 120 by the agent 110, and imbalanced data volume or size communicated between the agent 110 and the assigned devices 120. In an embodiment, as an alternative to the cloud server 102, or the superior control agent 110s, an agent 110 detecting load imbalance or agent failure broadcasts a rebalancing request to its peers.

The commands to the devices 120, that are administered by the cloud server 102 or agents 110, may be based on various factors such as energy/power consumption levels by each device 120 or the overall facility 104 and operational costs of each device 120 or the overall facility 104. The commands may also be based on, at least in part, obligations related to the facility 104 or the devices 120, such as contractual, regulatory, or certification obligations of the facility 104 or the devices 120. Such obligations may include environmental, social, and governance (ESG) obligations, energy contracts, agreements, and obligations (such as power purchase agreements (PPAs), energy hedges, and participation in ancillary services and demand response programs), and reducing environmental impacts (such as reducing GHG emission footprints).

An energy agreement may include agreements with one or more authorities managing the energy grid 130, a behind-the-meter (BTM) power supply, or any other external service providers administering energy sourcing to the facility 104. The energy agreement may include power blocks purchased from the energy grid 130, power purchase agreement (PPA) between the facility 104 and BTM supply, Virtual PPA (VPPA), energy hedge agreement with a non-energy grid counterparty to manage the financial risk in energy cost fluctuations, or incentive program agreements such as ancillary services and demand response program agreements, introduced by energy grid authorities, for example, to support the frequency regulation, voltage regulation, and balancing supply and demand in the energy grid 130 network.

Moreover, the energy agreement may include programs that allow the facility 104 to flow excess energy generated from a co-located BTM supply or backup power storage to the energy grid 130 for a benefit such as monetary incentives.

Through any of these energy agreements, the facility 104 may be incentivized or may have the option to stop consuming energy, to sell back energy to the energy grid 130, to sell excess energy to the energy grid 130, to sell the option to purchase or use energy to the energy grid 130 or another interested entity, to cut energy consumption during certain time periods, to perform load shaping (i.e., to cause or achieve a particular load level over time, for example, maintaining a minimum energy consumption profile during certain time intervals, or having a certain level of device uptime), or to commit to consume certain amounts of energy in certain times. A person of skill in the art will understand that various types of energy agreements may exist between the energy grid 130 and the facility 104.

In an embodiment, the energy agreement is an energy option agreement, i.e., an agreement between the energy grid 130 and the facility 104, and associated with the delivery of energy to the facility 104. As part of the power option agreement, the facility (or the facility operator, contracting agent for the facility, and semi-automated and/or automated control system associated with the facility-such as facility administration controllers) provides the energy grid 130 with the right, but not the obligation, to reduce the amount of energy delivered to the facility 104 up to an agreed amount of energy during an agreed upon time interval. In order to provide the energy grid 130 with this option, the facility 104 needs to be using at least the amount of energy subjected to the option (e.g., a minimum energy threshold). For instance, the facility 104 may agree to use at least 1 MW of energy from the energy grid at all times during a specified 24-hour time interval to provide the energy grid 130 with the option of being able to reduce the amount of energy delivered to the load by any amount up to 1 MW at any point during the specified 24-hour time interval. The facility 104 may grant the energy grid 130 this option in exchange for a monetary consideration such as receiving energy at a reduced price and/or monetary payments if the option is exercised by the energy grid 130.

In an embodiment, the power option agreement provides a sequence of minimum energy limits over different periods of time. The power option agreement may provide maximum power consumption targets that the facility 104 is committed to stay below.

According to an embodiment, the commands to the devices 120, which are administered by the cloud server 102 or agents 110, may be based on a target power consumption target for the facility 104. The target power consumption may be derived or prescribed from the above-mentioned energy agreements or obligations (which may be derived from mandatory directives or optional directives such as grid incentive programs) or may be derived from other factors such as overall cost (energy cost, operational costs, and overall compute cost) and environmental impacts of the facility 104. Accordingly, the target power consumption may be provided as an input to the cloud server 102 or an agent 110 or may be calculated by the cloud server 102 or an agent 110 according to a rule. The power consumption target may include minimum and/or maximum power thresholds to which the energy consumption profile of the facility 104 is bound. The minimum and maximum power thresholds may vary over time in a stepwise manner or in a dynamic manner (i.e., with continuous change over time). In some examples, the target power consumption may include a range (including both a minimum and a maximum) rather than a single minimum threshold or a single maximum threshold. In some examples, over some periods of time, there may be no mandatory power consumption target, and the facility 104 may have a degree of freedom in consuming unbounded energy and depending on its demand. In some embodiments, the minimum power threshold may be zero.

The commands commissioned by the cloud server 102 or the agents 110 may direct the energy consumption of the device and thus the overall facility 104 to follow target power consumption levels or follow various load shaping profiles. In one example, the commissioned commands may instruct the devices 120 to operate in such a way to increase the power consumption of the facility 104 above a minimum threshold which is the target power consumption or decrease the power consumption below a maximum threshold. According to another example, the commissioned commands may instruct the devices 120 to operate in such a way to increase or decrease the power consumption of the facility 104 to reach or follow the target power consumption levels over various periods of time.

In accordance with another embodiment, the commands commissioned by the cloud server 102 or the agents 110 may be based on a grid frequency response program which may be derived or prescribed from the above-mentioned energy agreements or obligations (which may be derived from mandatory directives or optional directives such as grid incentive programs such as fast frequency response (FFR), or primary frequency response (PFR) programs in the Electric Reliability Council of Texas (ERCOT)) or may be derived from other factors such as overall instability and reliability in the sourced power within the facility 104. One of the IoT devices 120 may be a frequency meter (e.g., a synchro-phasors measurement device) configured to measure the frequency of the power supplied by the power grid 130. The frequency measurements may be monitored by an agent 110, which may then trigger one or more commands to the devices 120 according to a rule to comply with frequency response programs of the grid 130. For example, if the frequency drops below a prescribed threshold (indicating a shortage of power generation in the grid 130), an agent 110 connected to the frequency meter may trigger a command to modify the operation of the devices 120 (e.g., shutting down a portion of the devices 120) to reduce the overall power consumption of the facility 104 quickly. The power consumption reduction may be active for a predetermined time (e.g., 15 minutes) prescribed by the frequency response program, or until the frequency reaches a safe threshold for a reliable period of time, or until the frequency responsiveness is recalled by a grid operator, for example.

Key advantages of the device management system 100:

decentralized control and management with the cloud server 102 providing a supervisory or backup role, such that while the cloud server 102 provides oversight and high-level coordination, the control agents 110 may be configured to act semi-autonomously or autonomously;

efficient and scalable device management by sharing and rebalancing device management among multiple collaborative agents 110;

redundant device management for increased reliability: by assigning multiple control agents 110 to the same batch 122 of devices, the system 100 provides high reliability;

adaptive and flexible assignment and reassignment of the devices 120, which allows for dynamic assignment and rebalancing of the devices 120 across the control agents 110, based on various factors and rules that may further be flexible (this helps optimize resource usage, enhance energy efficiency, and provide robust fault tolerance); and closed-loop management of the devices 120 by the agents 110, which continuously monitor the success of command execution, reducing the need for manual intervention and minimizing downtime.

EXAMPLES

Example 1—Device Monitoring in a Datacenters

Monitoring power consumption is highly desirable in a datacenter for optimizing energy efficiency and preventing overloading of electrical phases. Agents 110 may be configured to track the real-time energy consumption of individual devices 120 such as ASIC miners, Power Distribution Units (PDUs), and computing servers. If power usage spikes unexpectedly, the agent 110 may take corrective action, for example redistributing the power load. In doing so, agents 110 may track key metrics in individual devices 120, across a batch of devices 122, or across all devices 120. Such metrics may include Watts consumed, voltage, current, energy efficiency (e.g., PUE-Power Usage Effectiveness).

In one particular example, PDUs, which are responsible for distributing electrical power to various equipment such as computing servers and networking devices, are managed by agents 110 to track the on/off state of each PDU to ensure the PDUs are delivering power as expected. The agents 110 read the PDU's power status (e.g., powered on, off, or in a fault state). If a PDU fails (e.g., due to overheating or a power surge), the agent 110 is configured to alert the cloud server 102 or trigger immediate corrective action such as starting a root cause analysis, fault detection, and/or maintenance procedures or redistributing power load to another PDU. The agents 110 track various key metrics in a PDU such as number of failures, on/off status over time, uptime, and energy consumption levels. Moreover, the agents 110 track power loads across different electrical phases to prevent overloading or underloading of PDU circuits, which may cause inefficiency or potential outages. If a phase is imbalanced, agents 110 redistribute power loads or trigger shutdowns in low-priority devices 120 or device batches 122 to ensure operational stability. The agents 110 further monitor voltage, frequency, and current levels to avoid equipment and device damage due to electrical fluctuations.

Example 2—Scanning Devices in a Datacenter Facility

In a large-scale datacenter, for the management of IoT devices (e.g., servers, ASICs, PDUs, cooling systems, sensors) it is highly desirable to provide continuous monitoring to ensure that all devices are online and functioning properly. To streamline this process using the proposed device management system 0100, a request to scan the network of connected devices 120 may be initiated manually by a user or operator of the datacenter (e.g., the user 229), programmatically, or triggered by an event (e.g., a missing device 120 from the log file). For example, a datacenter operator identifies a need to check for missing or new devices 120 in a specific part of the datacenter facility (e.g., Site A 104). The operator issues a manual command to the agent 110 which has assumed the network master role (called master network agent 110*x* hereafter), which is responsible for managing the network scan and device discovery procedure. The command instructs the master network agent 110*x* to perform a full scan of the network, listing all available devices 120 in a specific IP range (e.g., 192.168.0.1 to 192.168.0.255). Besides the IP or address range, the command may further include the type of searched devices 120 (e.g., ASICs, PDUs, cooling devices, temperature sensors, humidity sensors, and smoke detectors), and a scan frequency (e.g., immediate, with periodic follow-ups every 6 hours).

The master network agent 110*x* may perform the scanning duty itself or may delegate the scanning responsibility to an agent 110*y* designated specifically for network scanning duties (called scanning agent 110*y* hereafter). The scanning agent 110*y* may be selected based on its proximity to the devices 120 or its role in the network. The master network agent 110*x* communicates the commissioned commands by the operator to the scanning agent 110*y*, detailing the specific IP range, device types to be scanned, and other command parameters such as frequency of scans. The scanning agent 110*y* may acknowledge the request and prepare to scan the designated network segment. The scanning agent 110*y* initiates a network scan, pinging each IP address within the specified range to discover active devices 120. The scanning agent 110*y* performs this task using communication protocols such as TCP/IP, querying devices 120 for their status, capabilities, and metrics. For each scanned device 120, the scanning agent 110*y* may log or record the device type, device ID, device status (e.g., online/offline), and device metrics (e.g., power consumption, temperature, and uptime). The scanning agent 110*y* may also mark new devices 120 added to the network (e.g., new devices 120 that were not present in a previous scan) and/or missing devices 120 (e.g., if a device 120 from a known list is not responding). The missing devices 120 may be flagged for further investigation.

Once the scan is completed, the scanning agent 110*y* shares its log file with the master network agent 110*x*. The master network agent 110*x* may update a central log file of devices in the network and rebalance device assignment to control agents 110 based on predefined criteria (e.g., proximity, CPU/memory capacity, or network load balancing). For example, a new ASIC 120 discovered at IP address 192.168.0.20 may be assigned to an ASIC control agent 110 with sufficient processing capacity to manage additional devices. Similarly, if a PDU is found missing, an alert is sent to the corresponding PDU control agent 110, which may trigger corrective actions (e.g., physical inspection or power cycle commands).

For newly found and assigned devices 120, an agent 110 responsible for setting device command rules (called master device commands agent hereafter), may issue commands to agents 110 to configure the devices 120. The configuration commands may include assigning IP addresses, defining rules for monitoring device metrics (e.g., power usage thresholds for PDUs), and setting power management rules, such as shutting down devices during off-peak hours to save energy or issuing alerts if a sensor detects abnormal temperature levels. Doing so allows the newly discovered devices 120 to become fully integrated into the datacenter's IoT system 100, establishes continuous monitoring, and ensures that all devices 120 are accounted for, properly assigned, and governed by rules.

The invention claimed is:

1. A system for monitoring and managing a plurality of devices including at least one energy-consuming device in a facility, the system comprising:
 a network comprising the plurality of devices;
 a plurality of control agents connected to the plurality of devices, each control agent from the plurality of control agents being assigned to a batch of devices from the plurality of devices according to one or more assignment criteria to share management of the plurality of devices among the plurality of control agents; and
 a cloud server connected to the plurality of control agents;
 wherein each respective control agent from the plurality of control agents monitors at least one device in the assigned batch of devices by reading and tracking status, data, and metrics of the device to ensure an energy-consumption target for the assigned batch of devices and sending a command to the at least one device in a closed-loop manner;
 wherein the respective control agent further monitors execution of the command by the at least one device;
 wherein the command is re-sent where the command is not executed by the at least one device or where there is an unexpected change in the status of the at least one device after successful execution of the command, wherein where the command is re-sent and after an elapsed time, the respective control agent proactively takes corrective action to verify the energy-consumption target is ensured.

2. The system of claim 1, wherein the respective control agent monitors the execution of the command continuously with a set frequency.

3. The system of claim 1, wherein the one or more assignment criteria include one or more of: a randomly assigned protocol, a physical address of the respective control agent, a capacity of the respective control agent, a location of each device in the plurality of devices, an address range of the device, and an electrical phase powering the device.

4. The system of claim 1, wherein the one or more assignment criteria are defined by the cloud server or a selected control agent from the plurality of control agents.

5. The system of claim 4, wherein the selected control agent is a superior agent that is distinguished by a special characterization, that is the oldest agent in the network or that has superior computational resources.

6. The system of claim 1, wherein each control agent from the plurality of control agents is configured to assume a role in response to the command, wherein a control agent with the assumed role is a master among the plurality of control agents.

7. The system of claim 6, wherein the assumed role includes a master network agent and a master device command agent.

8. The system of claim 1, wherein multiple control agents from the plurality of control agents are assigned to a same batch of devices from the plurality of devices.

9. The system of claim 8, wherein each of the multiple control agents is configured to monitor and send commands to devices of the same assigned batch of devices simultaneously.

10. The system of claim 1, wherein where a new control agent is added to the network or a control agent from the plurality of control agents goes offline from the network, assignment of the plurality of devices is redistributed among available control agents.

11. The system of claim 10, wherein the redistribution of assignment of the plurality of devices to the available control agents is effected by a rebalancing command initiated from the cloud server or from a first control agent from the plurality of control agents.

12. The system of claim 11, wherein the rebalancing command is broadcasted by the first control agent from the plurality of control agents to all other control agents from the plurality of control agents.

13. The system of claim 12, wherein when the new control agent is added to the network, the new control agent identifies an assigned local IP and MAC address to the cloud server or other control agents from the plurality of control agents in the network to facilitate rebalancing of the plurality of devices to the plurality of control agents.

14. The system of claim 1, wherein where workloads on one or more control agents from the plurality of control agents are imbalanced, the plurality of control agents are configured to redistribute the assigned batch of devices to improve load balancing among the one or more control agents on which the workloads are imbalanced.

15. The system of claim 1, wherein a first control agent from the plurality of control agents is configured to detect a second control agent from the plurality of control agents going offline, and wherein the plurality of control agents are configured to be reassigned to the plurality of devices to fill in for the second control agent.

16. The system of claim 1, further comprising a log file stored at the cloud server and/or on a control agent from the plurality of control agents, the log file comprising a list of the plurality of control agents, a status of each of the plurality of control agents, and the batch of devices assigned to each of the plurality of control agents.

17. The system of claim 16, wherein the log file is accessible to and modifiable by each control agent from the plurality of control agents.

18. The system of claim 17, wherein a control agent from the plurality of control agents is configured to be requested, manually or automatically according to a rule, to scan for new devices to be connected to the network or previously connected devices from the plurality of devices that are missing from the network.

19. The system of any claims of claim 18, wherein a device from the plurality of devices is a frequency meter configured to measure frequency of electrical energy supplied to the facility, and wherein a control agent from the plurality of control agents is configured to monitor the frequency meter and trigger a command to modify the operation of one or more of the devices from the plurality of devices.

20. A method for monitoring and managing a plurality of devices including at least one energy-consuming device in a facility, the method comprising:

assigning a second plurality of control agents from a first plurality of control agents to a batch of devices from the plurality of devices according to one or more assignment criteria to share management of the plurality of devices among the second plurality of control agents; and connecting a cloud server to the second plurality of control agents;

wherein each respective control agent from the second plurality of control agents monitors each device in the assigned batch of devices by reading and tracking status, data, and metrics of the device to ensure an energy-consumption target for the assigned batch of devices and sending a command to the device in a closed-loop manner;

wherein the respective control agent further monitors execution of the command by the device;

wherein the command is re-sent where the command is not executed by the device or where there is no change in the status of the device after successful execution of the command, wherein where the command is re-sent and after an elapsed time, the respective control agent proactively takes corrective action to verify the energy-consumption target is ensured.

* * * * *